(12) United States Patent
Onishi

(10) Patent No.: US 8,508,506 B2
(45) Date of Patent: Aug. 13, 2013

(54) ILLUMINATION DEVICE AND ELECTRO-OPTICAL APPARATUS

(75) Inventor: Yasunori Onishi, Azumino (JP)

(73) Assignee: Epson Imaging Devices Corporation (JP)

( * ) Notice: Subject to any disclaimer, the term of this patent is extended or adjusted under 35 U.S.C. 154(b) by 473 days.

(21) Appl. No.: 12/412,475

(22) Filed: Mar. 27, 2009

(65) Prior Publication Data

US 2009/0295744 A1     Dec. 3, 2009

(30) Foreign Application Priority Data

Jun. 3, 2008 (JP) ................................ 2008-145526
Nov. 26, 2008 (JP) ................................ 2008-300514

(51) Int. Cl.
*G06F 3/042* (2006.01)

(52) U.S. Cl.
USPC ........................................ 345/175; 178/18.09

(58) Field of Classification Search
None
See application file for complete search history.

(56) References Cited

U.S. PATENT DOCUMENTS

| | | | | |
|---|---|---|---|---|
| 6,690,363 | B2 * | 2/2004 | Newton | 345/173 |
| 7,385,594 | B2 * | 6/2008 | Liao et al. | 345/173 |
| 2002/0118177 | A1 * | 8/2002 | Newton | 345/173 |
| 2005/0237317 | A1 * | 10/2005 | Cok | 345/207 |
| 2007/0242718 | A1 * | 10/2007 | Kawakami | 372/50.12 |
| 2007/0296688 | A1 * | 12/2007 | Nakamura et al. | 345/102 |
| 2008/0158171 | A1 * | 7/2008 | Wong et al. | 345/173 |
| 2008/0210843 | A1 * | 9/2008 | Han et al. | 248/917 |
| 2009/0279029 | A1 * | 11/2009 | Kunii et al. | 349/116 |

FOREIGN PATENT DOCUMENTS

| | | |
|---|---|---|
| JP | 2004-295644 | 10/2004 |
| JP | 2004-303172 | 10/2004 |
| JP | 2008-083675 | 4/2008 |

* cited by examiner

*Primary Examiner* — Daniell L Negron
(74) *Attorney, Agent, or Firm* — Harness, Dickey & Pierce, P.L.C.

(57) ABSTRACT

An illumination device is provided which includes: an illumination light source that emits an illumination light; a first position-detecting light source that emits a first position detecting light; a second position-detecting light source that emits a second position detecting light; a first light guide plate which is provided with a first light incident surface that introduces the illumination light and the first position detecting light to an inside thereof and a first light emitting surface that is disposed to cross the first light incident surface while being disposed to be adjacent thereto and that emits therefrom the illumination light and the first position detecting light propagating through the inside; and a second light guide plate which is provided with a second light incident surface that is disposed to overlap with the first light guide plate in plan view and that introduces the second position detecting light to an inside thereof and a second light emitting surface that is disposed to cross the second light incident surface while being disposed to be adjacent thereto and that emits therefrom the second position detecting light propagating through the inside concurrently with the first position detecting light.

7 Claims, 10 Drawing Sheets

ILLUMINATION DEVICE AND ELECTRO-OPTICAL APPARATUS

The entire disclosure of Japanese Patent Application Nos. 2008-145526, filed Jun. 3, 2008 and 2008-300514, filed Nov. 26, 2008 are expressly incorporated by reference herein.

BACKGROUND

1. Technical Field

The present invention relates to an illumination device and an electro-optical apparatus, and more particularly, to an illumination device which can be suitable for use in a display apparatus having an optical position detecting unit.

2. Related Art

Generally, in a display apparatus having an electro-optical apparatus, such as a liquid crystal display, there is a case where an illumination device such as a backlight is used in order to allow a display screen to be visually recognized or to achieve a high level of visibility. There is also a case where an indicating position detecting unit such as a touch panel is formed in the display screen of the display apparatus. In such a case, when specific positions on the display screen are indicated by a pen, a finger or the like, corresponding indicating positions are detected to be input to an information processing apparatus or the like.

As an example of the indicating position detecting unit (position coordinate input unit) such as the touch panel, there is known a capacitive or resistive touch panel which is configured to detect a contact state on the display screen in a mechanical and electrical manner. As another example, there is also known an optical touch panel in which a number of infrared light beams are caused to scan along the display screen, and photodetectors for detecting these infrared light beams are provided so as to correspond to corresponding one of the infrared light beams, so that when these infrared light beams are blocked by a finger or the like, the position coordinates of the finger or the like can be detected. Although a variety of types of optical touch panels are known, examples thereof are described in JP-A-2004-295644 and JP-A-2004-303172, for example.

However, in the above-mentioned optical touch panel, it is necessary to arrange a number of light sources, photodetectors, or optical switches, light guide structures, and the like in the vicinity of the display screen so as to correspond to the resolution of the position coordinates which are to be detected. Therefore, the number of optical elements increases, which may increase the manufacturing cost, and also increase the power consumption.

SUMMARY

An advantage of some aspects of the invention is that it provides an illumination device in which an optical position detecting unit can be constructed with low cost and low power consumption and also provides an electro-optical apparatus (display apparatus) using such an illumination device.

In accordance with an aspect of the invention, an illumination device is provided which includes: an illumination light source that emits an illumination light; a first position-detecting light source that emits a first position detecting light; a second position-detecting light source that emits a second position detecting light; a first light guide plate which is provided with a first light incident surface that introduces the illumination light and the first position detecting light to an inside thereof and a first light emitting surface that is disposed to cross the first light incident surface while being disposed to be adjacent thereto and that emits therefrom the illumination light and the first position detecting light propagating through the inside; and a second light guide plate which is provided with a second light incident surface that is disposed to overlap with the first light guide plate in plan view and that introduces the second position detecting light to an inside thereof and a second light emitting surface that is disposed to cross the second light incident surface while being disposed to be adjacent thereto and that emits therefrom the second position detecting light propagating through the inside concurrently with the first position detecting light.

In accordance the above aspect of the invention, the illumination light emitted from the illumination light source is introduced from the first light incident surface of the first light guide plate to the inside of the first light guide plate and is emitted from the first light emitting surface while propagating through the inside, thereby performing the illumination function. The first position detecting light emitted from the first position-detecting light source is introduced from the first light incident surface of the same first light guide plate to the inside of the first light guide plate and is emitted from the first light emitting surface after propagating through the inside concurrently with the illumination light. Moreover, the second position detecting light emitted from the second position-detecting light source is introduced from the second light incident surface of the second light guide plate to the inside of the second light guide plate and is emitted from the second light emitting surface after propagating through the inside concurrently with the first position detecting light. Therefore, when the photodetector is provided on the emitting side, the first position detecting light and the second position detecting light are reflected to be detected by the photodetector. Here, since the propagation distance of the first position detecting light and the second position detecting light detected by the photodetector varies depending on the position of the target object, it is possible to acquire the positional information of the target object in accordance with the detection state of the first position detecting light and the second position detecting light. Therefore, by causing the illumination light and the first position detecting light to be introduced from the first light incident surface of the first light guide plate and causing the second position detecting light to be introduced from the second light incident surface of the second light guide plate, even when the positions of the first position-detecting light source and the second position-detecting light source are spaced from each other, or even when the propagation directions of the first position detecting light and the second position detecting light are different, it is possible to allow both position detecting lights to efficiently propagate by optimizing the light guide structure of each of the light guide plates. Therefore, even when the number of position-detecting light sources is decreased, the positional information of the target object can be acquired in a secure manner. Accordingly, it is possible to incorporate the position detection function in the illumination device at low cost and with low power consumption.

In accordance with one embodiment of the invention, the illumination device has such a configuration that the first light incident surface is disposed on one side of the first light emitting surface with respect to the first light guide plate, and the second light incident surface is disposed on the other side of the second light emitting surface with respect to the second light guide plate. A position detecting unit per se is able to acquire the positional information of the target object as long as the first position-detecting light source and the second position-detecting light source are located at different positions. By configuring such that the first position detecting light and the second position detecting light are caused to be introduced from the first light incident surface and the second light incident surface which are located on opposite directions in the first light guide plate and the second light guide plate, respectively, to the inside of the respective light guide plates, it is possible to allow both position detecting lights to propagate in different directions through the inside of the respective light guide plates. Therefore, the positional information of the target object can be acquired based on both position detecting lights with a higher accuracy.

In accordance with another embodiment of the invention, the illumination device has such a configuration that the first light guide plate is provided with a light guide structure in which a ratio of light intensity of the light emitted from the first light emitting surface to the internally propagating light increases as it goes from a side of the first light incident surface toward an outer edge portion on an opposite side thereof. According to such a configuration, when the illumination light and the first position detecting light propagate through the inside after being introduced from the first light incident surface, because of the light guide structure, it is possible to suppress a decrease in the emission light intensity as viewed in the internal propagation direction. Therefore, it is possible to achieve uniformization of the illumination intensity along the internal propagation direction and the luminance of the first position detecting light as a whole.

In accordance with a further embodiment of the invention, the illumination device has such a configuration that the second light guide plate is provided with a light guide structure in which a ratio of light intensity of the light emitted from the second light emitting surface to the internally propagating light increases as it goes from a side of the second light incident surface toward an outer edge portion on an opposite side thereof. According to such a configuration, because of the light guide structure, it is possible to suppress a decrease in the emission light intensity as viewed in the internal propagation direction of the second position detecting light. Therefore, it is possible to achieve uniformization of the illumination intensity along the internal propagation direction and the luminance of the second position detecting light as a whole.

In accordance with a still further embodiment of the invention, the illumination device has such a configuration that a plurality of the illumination light sources is provided, some of the plurality of illumination light sources being disposed to oppose the first light incident surface, and the other of the plurality of illumination light sources being disposed to oppose the second light incident surface. According to such a configuration, since the illumination light source is disposed so as to oppose the first light incident surface and the second light incident surface, it is possible to allow the illumination light to propagate from both light incident surfaces concurrently with the corresponding position detecting lights. Therefore, it is possible to increase the light incidence efficiency of the illumination light and the position detecting light as a whole.

In accordance with another aspect of the invention, an illumination device is provided which includes: an illumination light source that emits an illumination light; a first position-detecting light source that emits a first position detecting light; a second position-detecting light source that emits a second position detecting light; an illuminating light guide plate which is provided with a light incident surface that introduces the illumination light to an inside thereof and a light emitting surface that is disposed to cross the light incident surface while being disposed to be adjacent thereto and which is configured to emit therefrom the illumination light propagating through the inside; and a position-detecting light guide plate which is disposed to overlap with the illuminating light guide plate in plan view and which is provided with a light incident surface that introduces the first position detecting light and the second position detecting light to an inside thereof and a light emitting surface that is disposed to cross the light incident surface while being disposed to be adjacent thereto and that emits therefrom the first position detecting light and the second position detecting light propagating through the inside concurrently with each other in a direction crossing an incident direction to the light incident surface.

In accordance with the above aspect of the invention, the illumination light emitted from the illumination light source is introduced from the light incident surface of the illuminating light guide plate to the inside of the illuminating light guide plate and is emitted from the light emitting surface while propagating through the inside, thereby performing the illumination function. The first position detecting light emitted from the first position-detecting light source and the second position detecting light emitted from the second position-detecting light source are introduced from the light incident surface of the position-detecting light guide plate to the inside of the position-detecting light guide plate and is emitted from the light emitting surface after propagating through the inside concurrently with each other. Therefore, when the photodetector is provided on the emitting side, the first position detecting light and the second position detecting light are reflected to be detected by the photodetector. Here, since the propagation distance of the first position detecting light and the second position detecting light detected by the photodetector varies depending on the position of the target object, it is possible to acquire the positional information of the target object in accordance with the detection state of the first position detecting light and the second position detecting light. Therefore, by arranging the illuminating light guide plate and the position-detecting light guide plate in a separate manner so as to overlap with each other in plan view to optimize the light guide structure of each of the light guide plates, the illumination function and the position detection function can be realized in an efficient and appropriate manner. Therefore, even when the number of position-detecting light sources is decreased, the positional information of the target object can be acquired in a secure manner. Accordingly, it is possible to incorporate the position detection function in the illumination device at low cost and with low power consumption.

In the above embodiment of the invention, since the illuminating light guide plate and the position-detecting light guide plate are provided in a separate manner, it is possible to obtain an advantage that the light guide structure of each of the illuminating light guide plate and the position-detecting light guide plate can be set to comply with the respective function in an independent manner. That is, in order to improve the illumination function, the light guide structure of the illuminating light guide plate can be adapted to comply with the wavelength distribution or the directivity of the light emitted from the illumination light source and the position or the arrangement of the illumination light source. Moreover, in order to improve the position detection function, the light guide structure of the position-detecting light guide plate can be adapted to comply with the wavelength distribution or the directivity of the light emitted from the position-detecting light source and the position or the arrangement of the position-detecting light source.

For example, since the state of disposition or arrangement of the illumination light source with respect to the illuminating light guide plate is generally different from the state of disposition or arrangement of the first and second position-detecting light sources with respect to the position-detecting light guide plate, in order to reduce a deviation in the illumination intensity of the illuminating light guide plate or a deviation of the position detecting light on the position-detecting light guide plate, it is preferable to change the pattern of the ratio of light intensity of the emitted light to the internally propagating light for each of the light guide plates to comply with the different in the state of disposition or arrangement of these light sources.

Moreover, the light emitted from the illumination light source may be different from the wavelength of the light emitted from the position-detecting light source. For example, the light emitted from the illumination light source may have a wavelength distribution centered at the visible-light wavelength, and the light emitted from the position-detecting light source may have a wavelength distribution centered at the infrared-light wavelength. In such a case, the same light scattering structure (which is a portion of the light guide structure for setting the ratio of light intensity of the emitted light by scattering the internally propagating light) exhibits different light scattering characteristics for the light emitted from the illumination light source having shorter wavelength and the light emitted from the position-detecting light source having longer wavelength. Therefore, it is preferable to change the light scattering structure of each of the light guide plates to comply with the light scattering characteristics corresponding to respective wavelengths.

In accordance with one embodiment of the invention, the illumination device has such a configuration that the first position-detecting light source and the second position-detecting light source are disposed at opposite positions with the position-detecting light guide plate disposed therebetween. Since the first position-detecting light source and the second position-detecting light source oppose each other with the position-detecting light guide plate disposed therebetween, the first position detecting light and the second position detecting light can be caused to be incident to the position-detecting light guide plate from both sides of the position-detecting light guide plate and propagate through the inside of the position-detecting light guide plate in opposite directions. When the position of the target object in the direction of connecting both light sources is detected, if the position is changed, the propagation distances of the first position detecting light and the second position detecting light in the inside of the position-detecting light guide plate exhibit reverse correlation. Therefore, by using both position detecting lights, the position of the target object in the above-mentioned direction can be detected with a higher accuracy.

In accordance with another embodiment of the invention, the illumination device has such a configuration that the light incident surface of the position-detecting light guide plate includes a first light incident surface that is formed on a side located on one side of the light emitting surface and a second light incident surface that is formed on a side located on the other side of the light emitting surface, the first position-detecting light source being disposed to oppose the first light incident surface, and the second position-detecting light source being disposed to oppose the second light incident surface.

In accordance with a further embodiment of the invention, the illumination device has such a configuration that the illuminating light guide plate is provided with a light guide structure in which a ratio of light intensity of the light emitted from the light emitting surface to the internally propagating light increases as it goes from a side of the light incident surface toward an outer edge portion on an opposite side thereof.

In accordance with a still further embodiment of the invention, the illumination device has such a configuration that the position-detecting light guide plate is provided with a light guide structure in which a ratio of light intensity of the light emitted from the light emitting surface to the internally propagating light increases as it goes toward a central point of a line which connects the first position-detecting light source and the second position-detecting light source with each other. According to such a configuration, since the position-detecting light guide plate is provided with the light guide structure in which the ratio of light intensity of the emitted light to the internally propagating light on the position-detecting light guide plate is small in the vicinity of the first position-detecting light source and the second position-detecting light source and increases toward the central point, it is possible to improve the uniformity of the position detecting light emitted from the light emitting surface of the position-detecting light guide plate.

Moreover, as described above, when the illuminating light guide plate and the position-detecting light guide plate are disposed to oppose the illumination light source or the position-detecting light source, and the light incident surface on which the light from the respective light source is incident and the light emitting surface from which the light having propagated through the inside of the respective light guide plates is emitted are arranged to cross each other, the light guide structure of the illuminating light guide plate and the position-detecting light guide plate is provided with a light guide path in which the light incident from the light incident surface is caused to propagate along the light emitting surface and a light scattering structure which is formed in the inside of the light guide path, on the light emitting surface, or on a surface opposing the light emitting surface. This light scattering structure is a structure for scattering at least a portion of the internally propagating light in order to allow the internally propagating light propagating through the inside of the light guide path from the light emitting surface in a predetermined ratio of light intensity. For example, the light scattering structure may be configured by particles which are dispersed to the inside of the light guide plate, an uneven surface structure or a prism structure, such as a roughened surface, a scattering layer formed on a surface, and the like.

In the above-described embodiments of the invention, it is preferable that the first position-detecting light source and the second position-detecting light source are formed on mutually opposing sides of the light guide plates, respectively. When the first position-detecting light source and the second position-detecting light source are disposed on the mutually opposing sides at both sides of the light guide plates, the first position detecting light and the second position detecting light can be introduced to the inside of the light guide plates from both sides thereof. Therefore, the positional information in the direction of connecting both light sources with each other can be detected with a higher accuracy.

In the above-described embodiments of the invention, it is preferable that the illumination device further includes: a photodetector that is disposed on an emitting side of each of the first light guide plate and the second light guide plate, from which the first position detecting light and the second position detecting light are emitted, and that detects a reflected light of each of the first position detecting light and the second position detecting light, which is reflected from a target object; and a positional information acquisition unit that acquires positional information of the object in accordance with a ratio of light intensity of the first position detecting light and the second position detecting light which are received by the photodetector. According to such a positional information acquisition unit, when the first position detecting light and the second position detecting light propagating through the inside of the light guide plates are emitted from the light emitting surface and then reflected by the target object to be detected by the photodetector, by calculating the ratio of the attenuation coefficients of both position detecting lights from the ratio of the intensity of the first position detecting light to the intensity of the second position detecting light, it is possible to acquire the positional information of the target object corresponding to the propagation distances of both position detecting lights in the inside of the light guide plate.

In accordance with a further aspect of the invention, an electro-optical apparatus is provided which includes: an illumination light source that emits an illumination light; a first position-detecting light source that emits a first position detecting light; a second position-detecting light source that emits a second position detecting light; a first light guide plate which is provided with a first light incident surface that introduces the illumination light and the first position detecting light to an inside thereof and a first light emitting surface that is disposed to cross the first light incident surface while being disposed to be adjacent thereto and which is configured to emit therefrom the illumination light and the first position detecting light propagating through the inside; a second light guide plate which is provided with a second light incident surface that is disposed to overlap with the first light guide plate in plan view and that introduces the second position detecting light to an inside thereof and a second light emitting surface that is disposed to cross the second light incident surface while being disposed to be adjacent thereto and that emits therefrom the second position detecting light propagating through the inside concurrently with the first position detecting light. an electro-optical panel that is disposed in the first light guide plate in a direction for emitting the illumination light; and a photodetector that is disposed on an emitting side of each of the first light guide plate and the second light guide plate, from which the first position detecting light and the second position detecting light are emitted, and that detects a reflected light of each of the first position detecting light and the second position detecting light, which is reflected from a target object.

In accordance with a still further aspect of the invention, an electro-optical apparatus is provided which includes: an illumination light source that emits an illumination light; a first position-detecting light source that emits a first position detecting light; a second position-detecting light source that emits a second position detecting light; an illuminating light guide plate which is provided with a light incident surface that introduces the illumination light to an inside thereof and a light emitting surface that is disposed to cross the light incident surface while being disposed to be adjacent thereto and which is configured to emit therefrom the illumination light propagating through the inside; a position-detecting light guide plate which is disposed to overlap with the illuminating light guide plate in plan view and which is provided with a light incident surface that introduces the first position detecting light and the second position detecting light to an inside thereof and a light emitting surface that is disposed to cross the light incident surface while being disposed to be adjacent thereto and that emits therefrom the first position detecting light and the second position detecting light propagating through the inside concurrently with each other in a direction crossing an incident direction to the light incident surface; and an electro-optical panel that is disposed in the illuminating light guide plate in a direction for emitting the illumination light; and a photodetector that is disposed on an emitting side of the second light guide plate, from which the first position detecting light and the second position detecting light are emitted, and that detects a reflected light of each of the first position detecting light and the second position detecting light, which is reflected from a target object.

When the electro-optical panel of each of the above-described electro-optical apparatuses is a transmissive panel, by setting the emitting direction of the illumination light to be identical with the emitting direction of the first position detecting light and the second position detecting light, the electro-optical panel is illuminated with the illumination light having transmitted therethrough so that the display screen is visually recognized by the transmitted light. Moreover, the first position detecting light and the second position detecting light are caused to pass through the electro-optical panel to be emitted to the side of the electro-optical panel, so that the light reflected from the target object which is placed on a side of the electro-optical panel opposite to the light guide plate can be detected by the photodetector. In this case, the photodetector may be disposed on a side of the electro-optical panel opposite to the light guide plates, within the electro-optical panel, or on a side of the electro-optical panel close to the light guide plates.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

First Embodiment

Figure 1:
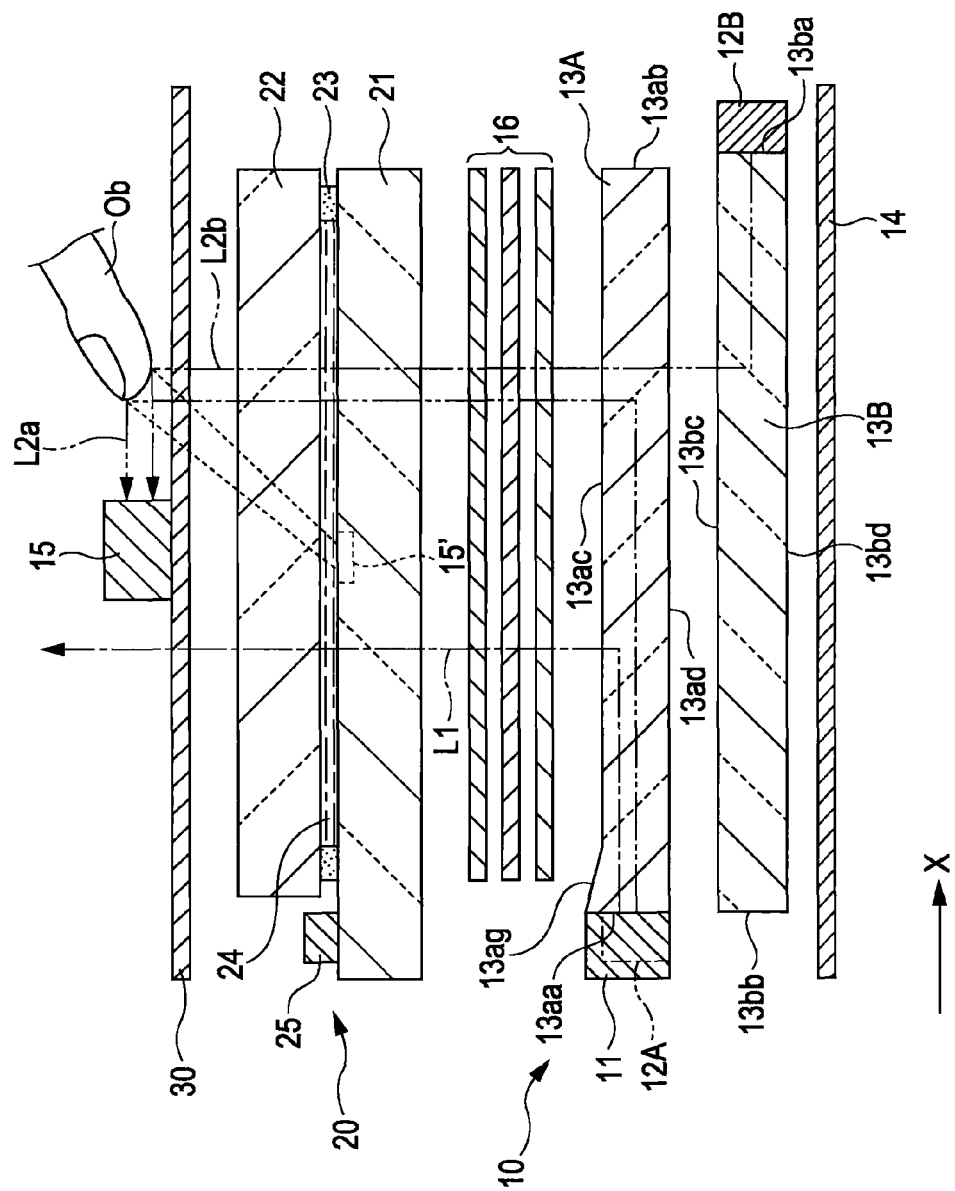
FIG. 1 is a simplified cross-sectional view schematically illustrating structure of an illumination device and an electro-optical apparatus according to a first embodiment of the invention.
Figure 2:
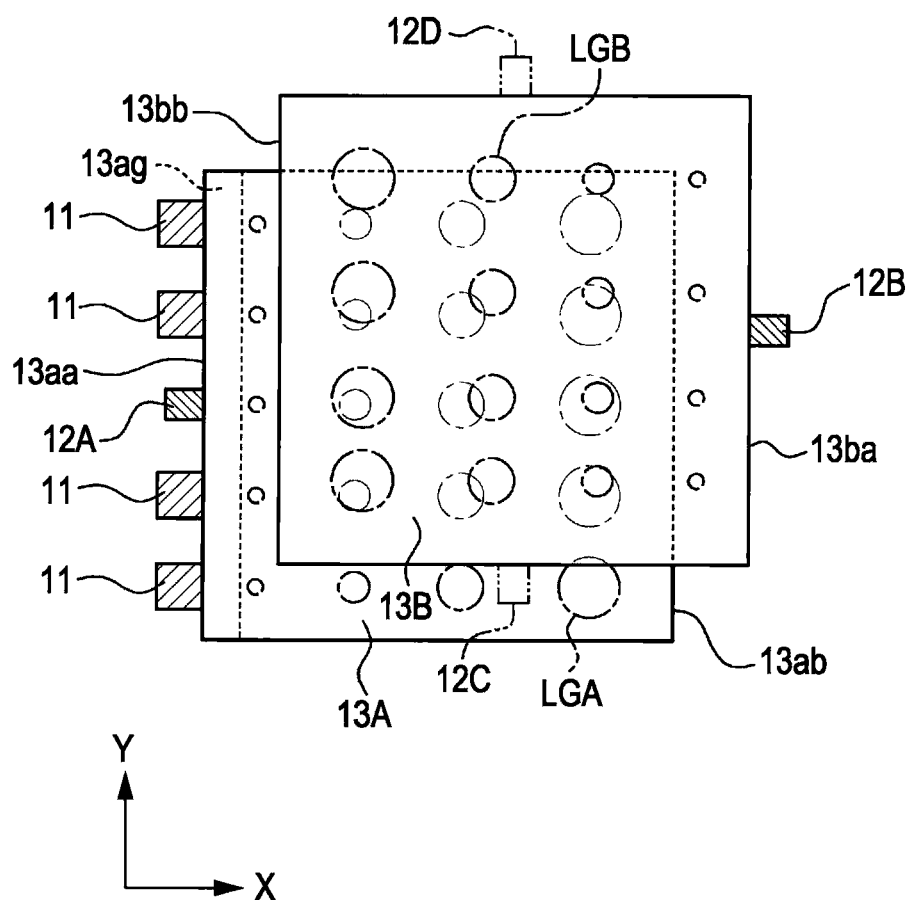
FIG. 2 is a perspective view of a light source and a light guide plate according to the first embodiment, as viewed from a rear surface thereof.

FIG. 1 is a simplified cross-sectional view schematically illustrating structure of an illumination device and an electro-optical apparatus according to a first embodiment of the invention, and FIG. 2 is a perspective view of a light source and a light guide plate according to the first embodiment, as viewed from a rear surface thereof.

An illumination device 10 according to the present embodiment is provided with an illumination light source 11 that emits an illumination light L1, position-detecting light sources 12A and 12B that emit position detecting lights L2a and L2b, respectively, a first light guide plate 13A and a second light guide plate 13B on which these lights are incident, a reflecting plate 14 that is disposed at the back of the light guide plates 13A and 13B, and a photodetector 15 that is disposed on an emitting side from which the position detecting lights are emitted. The light guide plates 13A and 13B are formed of a transparent light guiding material such as acryl resin or polycarbonate resin. The first light guide plate 13A has a first light incident surface 13aa which is an end face of one side thereof, an light emitting surface 13ac that is adjacent to the light incident surface while being disposed to cross (in the illustrated example, be perpendicular to) the light incident surface, and a back surface 13ad that is on an opposite side of the light emitting surface 13ac. The second light guide plate 13B has an light incident surface that includes a second light incident surface 13ba which is an end face of a side thereof on an opposite direction to the first light incident surface 13aa, an light emitting surface 13bc that is adjacent to the light incident surface while being disposed to cross (in the illustrated example, be perpendicular to) the light incident surface, and a back surface 13bd that is on an opposite side of the light emitting surface 13bc. Further, on a light emitting side of each of the light guide plates 13A and 13B, an optical sheet 16 such as a light scattering plate for achieving uniformization of the illumination light, a light condensing plate, e.g., a prism sheet for increasing directivity of the illumination light, or the like is appropriately disposed as necessary.

On a light emitting side of the illumination device 10, an electro-optical panel 20 which is configured by a transmissive liquid crystal display or the like is disposed. For example, the electro-optical panel 20 has a configuration in which transparent substrates 21 and 22 are bonded together by a sealing material 23 with liquid crystals 24 being inserted between the substrates, and in which a plurality of pixels configured to be capable of controlling the alignment state of the liquid crystals 24 by means of non-illustrated electrodes is provided. In addition, a polarization plate (not illustrated) is disposed as necessary on an outer surface side of each of the substrates 21 and 22. The respective pixels are driven by a driving signal output from a driving circuit 25 which is configured by a semiconductor IC chip or the like and is controlled so that a predetermined transmission state is achieved for each pixel.

On a side of the electro-optical panel 20 opposite to the illumination device 10, a mounting board 30 which has light transmitting properties is disposed, and the photodetector 15 is disposed on an outer surface (a surface on an opposite side to the electro-optical panel 20) of the mounting board 30. The photodetector 15 is a light receiving element such as a photodiode and is configured to be capable of detecting intensity of the position detecting light. For example, if the position detecting light is an infrared light as described later, the photodetector 15 is also configured by a light receiving element which is sensitive to the infrared light.

The illumination light source 11 is a light emitting element such as an LED (light emitting diode) and is configured to emit the illumination light L1, which is a white light, for example, in response to a driving signal output from a non-illustrated driving circuit. As illustrated in FIG. 2, a plurality of illumination light sources 11 is arranged along the first light incident surface 13aa.

The position-detecting light sources 12A and 12B are configured by a light emitting element such as a LED (light emitting diode) and are configured to emit the position detecting lights L2a and L2b, which are infrared light, for example, in response to a driving signal output from a non-illustrated driving circuit. Although the position detecting light is not particularly limited, it is preferable that the position detecting light can be detected to be distinguished from the illumination light L1 or external light by later-described signal processing or the like, and also preferable that the position detecting light exhibits different wavelength distribution and different emission pattern from that of the illumination light L1. Further, it is preferable that the position detecting light has a wavelength range in which the light is efficiently reflected by a target object Ob according to the invention. For example, if the target object Ob is a human body such as a finger, the position detecting light is preferably an infrared light which has high reflectance on a surface of a human body (particularly, near-infrared light which is near a visible light region). The position-detecting light sources 12A and 12B are basically configured to be provided in plural units so as to emit position detecting light at mutually different positions. As will be described later, the same position-detecting light sources 12C and 12D, denoted by the two-dot chain line in FIG. 2, as the above-described position-detecting light sources 12A and 12B may be further provided.

As illustrated in FIG. 2, the light guide plates 13A and 13B are configured to have a rectangular shape in plan view, respectively, and the first light guide plate 13A and the second light guide plate 13B are arranged so as to overlap with each other in plan view. Moreover, the first light incident surface 13aa and the second light incident surface 13ba are formed on mutually opposite sides thereof, respectively. A plurality of illumination light sources 11 is arranged along the side of the first light incident surface 13aa. The illumination light L1 is introduced from the first light incident surface 13aa to an inside of the first light guide plate 13A and propagates through the inside toward an outer edge portion 13ab on an opposite side.

The first light guide plate 13A of the present embodiment basically has a first light guide structure LGA in which a ratio of light intensity of the light emitted from the light emitting surface 13ac to the internally propagating light increases monotonically as it goes from the side of the first light incident surface 13aa toward the outer edge portion 13ab on the opposite side. Although schematically illustrated by imaginary circles on the light emitting surface 13ac using the one-dot chain line in FIG. 2, the first light guide structure LGA is realized, for example, by gradually increasing, toward the internal propagation direction, the size of a refractive surface having fine unevenness shape for deflecting or scattering light, or the forming density of a printing layer, which is formed on the light emitting surface 13ac or the back surface 13*ad* of the first light guide plate 13A. By proving such a light guide structure LGA, the illumination light L1 and the position detecting light L2*a* incident from the first light incident surface 13*aa* can be emitted approximately uniformly from the light emitting surface 13*ac*, and as a result, the first light guide plate 13A is configured to act as a field light source.

The second light guide plate 13B has a second light guide structure LGB in which a ratio of light intensity of the light emitted from the light emitting surface 13*bc* to the internally propagating light increases monotonically as it goes from the second light incident surface 13*ba* toward an outer edge portion 13*bb* on an opposite side. Although schematically illustrated by circles on the light emitting surface 13*bc*, which have a diameter having a magnitude relationship corresponding the magnitude relationship of the ratio of light intensity, using the one-dot chain line in FIG. 2, the second light guide structure LGB is realized, for example, by gradually increasing, toward the internal propagation direction, the size of a refractive surface having fine unevenness shape for deflecting or scattering light, or the forming density of a printing layer, which is formed on the light emitting surface 13*bc* or the back surface 13*bd* of the second light guide plate 13B. By proving such a light guide structure LGB, the position detecting light L2*b* incident from the second light incident surface 13*ba* can be emitted approximately uniformly from the light emitting surface 13*bc*.

In the present embodiment, a sloped surface 13*ag* is provided in a surface portion (an outer periphery portion of the light emitting surface 13*ac*) on the light emitting side adjacent to the first light incident surface 13*aa*, so that in the outer periphery portion of the first light guide plate 13A, a thickness of the first light guide plate 13A is configured to increase gradually toward the first light incident surface 13*aa*. Owing to such a light incidence structure having the sloped surface 13*ag*, it is possible to increase the height of the first light incident surface 13*aa* while suppressing an increase in the thickness of a portion in which the light emitting surface 13*ac* is formed, so that the first light incident surface 13*aa* can be formed at a height corresponding to a height of a light emitting region of the illumination light source 11. This is to increase introduction efficiency of emission light from a light emitting element (the illumination light source 11), in which the progress in miniaturization is slow, to improve the illumination intensity, while decreasing the thickness of the first light guide plate 13A in order to comply with recent requests for making a display apparatus as thin as possible.

The position-detecting light source 12A is disposed to oppose the first light incident surface 13*aa* of the first light guide plate 13A. More specifically, the position-detecting light source 12A is disposed at a central portion of a side in which the first light incident surface 13*aa* is provided, within the row of the illumination light sources 11 which are arranged on the first light incident surface 13*aa*. Moreover, the position-detecting light source 12B is disposed to oppose the second light incident surface 13*ba* of the second light guide plate 13B. More specifically, the second position-detecting light source 12B is disposed at a central portion of a side in which the second light incident surface 13*ba* is provided. Moreover, since the first light guide plate 13A and the second light guide plate 13B are arranged so as to overlap with each other in plan view as described above, the incident positions of the position detecting lights L2*a* and L2*b* on the first light guide plate 13A and the second light guide plate 13B can be caused to be spaced apart from each other. Therefore, it is possible to increase an accuracy of later-described position detection based on both position detecting lights (that is, an accuracy of detection of position coordinates in a direction (X direction) along a line which connects the first light incident surface 13*aa* and the second light incident surface 13*ba* with each other).

Further, on end faces of the second light guide plate 13B on both sides in Y direction perpendicular to the above-mentioned X direction, the position-detecting light sources 12C and 12D are disposed so as to oppose each other. Since the position-detecting light sources 12C and 12D are disposed at mutually spaced positions along the Y direction as illustrated in the drawing, the incidence positions of position detecting lights L2*c* and L2*d* on the second light guide plate 13B can be caused to be spaced apart from each other. Therefore, it is possible to increase an accuracy of later-described position detection (detection of position coordinates in the Y direction) based on both position detecting lights.

In the above-described configuration, the first light guide plate 13A is disposed on the side of the electro-optical panel 20, and the second light guide plate 13B is disposed on the opposite side so that they overlap with each other in plan view. To the contrary, the second light guide plate 13B may be disposed on the side of the electro-optical panel 20, and the first light guide plate 13A may be disposed on the opposite side.

In the first embodiment having the above-described configuration, the illumination light L1 is incident on the first light guide plate 13A from the first light incident surface 13*aa* and is thereafter gradually emitted, in a field form, from an entire surface of the first light emitting surface 13*ac* while propagating through the inside of the light guide plate 13A. Then, the emitted light passes through the electro-optical panel 20 and the mounting board 30 to be emitted to an observation side. The illumination light L1 forms display images to be visually recognized, the display images being formed by controlling light transmittance of each of the pixels of the electro-optical panel 20. Moreover, the first position detecting light L2*a* is gradually emitted, in a field form, from an entire surface of the light emitting surface 13*ac* while propagating through the inside of the first light guide plate 13A from the first light incident surface 13*aa* and passes through the electro-optical panel 20 and the mounting board 30 to be emitted therefrom. At this time, when a target object Ob is present on a surface of the mounting board 30, a reflected light by the target object Ob is detected by the photodetector 15 which is disposed on the mounting board 30.

On the other hand, the position detecting light L2*b* (similarly L2*c* and L2*d*) is incident on the second light guide plate 13B from the second light incident surface 13*ba* and is thereafter gradually emitted, in a field form, from an entire surface of the light emitting surface 13*bc* while propagating through the inside of the second light guide plate 13B. The emitted light passes through the electro-optical panel 20 and the mounting board 30 to be emitted therefrom. At this time, when the target object Ob is present on a surface of the mounting board 30, a reflected light by the target object Ob is detected by the photodetector 15 which is disposed on the mounting board 30.

The intensity of the reflected light detected by the photodetector 15 includes contributions of the above-mentioned plurality of position detecting lights L2*a* and L2*b* (L2*c* and L2*d*). The position at which the photodetector 15 is provided is not limited to the position located on the mounting board 30, but it may be provided at an inside of the electro-optical panel 20 as the illustrated photodetector 15'. Alternatively, the photodetector 15 may be disposed at any positions such as on a top surface or a bottom surface of the first light guide plate 13A or the second light guide plate 13B, as long as it is able to detect the reflected light from the target object.

Next, a method of acquiring positional information of the target object Ob based on the detection by the photodetector 15 will be described. Although various method of acquiring the position may be considered, a method can be exemplified as an example thereof in which a ratio of attenuation coefficients is calculated based on the ratio of light intensity of two position detecting lights, and a propagation distance of each of both position detecting lights is calculated from the ratio of the attenuation coefficients, thereby calculating the position coordinates in the direction of connecting the corresponding two light sources with each other.

More specifically, a case where the position detecting light 12A is used as a first position-detecting light source and the position detecting light 12B is used as a second position-detecting light source, respectively, will be described. When a control amount (e.g., amount of current), a conversion coefficient, and an emission light intensity of the first position-detecting light source 12A are defined as Ia, ka and Ea, respectively, and a control amount (e.g., amount of current), a conversion coefficient, and an emission light intensity of the second position-detecting light source 12B are defined as Ib, kb and Eb, respectively, the relations of Ea=k·Ia and Eb=k·Ib are satisfied. Moreover, when an attenuation coefficient and a detected light intensity of the first position detecting light L2a are defined as fa and Ga, respectively, and an attenuation coefficient and a detected light intensity of the second position detecting light L2b are defined as fb and Gb, respectively, the relations of Ga=fa·Ea=fa·k·Ia and Gb=fb·Eb=fb·k·Ib are satisfied.

Therefore, if the photodetector 15 is able to detect Ga/Gb which is a ratio of detected light intensity of both position detecting lights, since a relation of Ga/Gb=(fa·Ea)/(fb·Eb)=(fa/fb)·(Ia/Ib) is satisfied, it is possible to determine the ratio of attenuation coefficients, fa/fb, as long as it is able to know values corresponding to the ratio of emission light intensities Ea/Eb and the ratio of control amounts Ia/Ib. Since the ratio of attenuation coefficients and the ratio of propagation distances of both position detecting lights are in positive correlation, by preliminarily setting this correlation, it is possible to obtain the positional information of the target object Ob (that is, the position coordinates in a direction from the first position-detecting light source to the second position-detecting light source).

As an example of a method of calculating the ratio of attenuation coefficients fa/fb, the first position-detecting light source 12A and the second position-detecting light source 12B are caused to be lighted in opposite phases (e.g., square-wave or sinusoidal-wave driving signals are operated at frequency capable of ignoring a phase difference resulting from a difference in the propagation distances so as to have a mutual phase difference of 180 degrees), and then, the waveforms of the detected light intensities are analyzed. More practically, for example, one control amount Ia is fixed (Ia=Im), and the other control amount Ib is controlled so that it is unable to observe detected waveforms (that is, so that the ratio of detected light intensities Ga/Gb becomes 0), thereby deriving the ratio of attenuation coefficients fa/fb from the present control amount Ib=Im·(fa/fb).

Moreover, it may be controlled so that the sum of both control amounts becomes always constant: Im=Ia+Ib. In this case, since a relation of Ib=Im·fb/(fa+fb) is satisfied, when the term fb/(fa+fb) is defined as $\alpha$, the ratio of attenuation coefficients is calculated as fa/fb=(1−$\alpha$)$\alpha$.

In the present embodiment, the positional information of the target object Ob in the X direction of the drawing can be acquired by driving the first position-detecting light source 12A and the second position-detecting light source 12B in opposite phases. On the other hand, the positional information of the target object OB in the Y direction can be acquired by driving the first position-detecting light source 12C and the second position-detecting light source 12D in opposite phases. Therefore, by causing a control system to sequentially perform the detection operation in the X direction and the Y direction, it is possible to acquire the position coordinates of the target object Ob on a plane.

Moreover, the planar position coordinates of the target object Ob may be acquired by sequentially calculating the coordinates while switching between a case where the position-detecting light source 12A and 12C are driven in phase with each other as a first position-detecting light source, and the position-detecting light sources 12B and 12D are driven in phase with each other as a second position-detecting light source, so that the first position-detecting light source and the second position-detecting light source are driven in opposite phases to detect the coordinates, and a case where the position-detecting light source 12A and 12D are driven in phase with each other as a first position-detecting light source, and the position-detecting light sources 12B and 12C are driven in phase with each other as a second position-detecting light source, so that the first position-detecting light source and the second position-detecting light source are driven in opposite phases to detect the coordinates. According to the configuration in which a plurality of position-detecting light sources is caused to be lighted at the same time, in detecting the positions in a direction from the side of the position-detecting light sources 12A and 12C as the first position-detecting light source to the side of the position-detecting light sources 12B and 12D as the second position-detecting light source, or in the opposite direction, a desired emission light intensity distribution on the light emitting surface (a favorable skewed light-dark distribution of the position detecting light) can be obtained in a wider range of areas than that obtainable from a configuration in which one position-detecting light source is lighted. Therefore, the position detection can be performed in a more accurate manner.

In accordance with the present embodiment, although it is possible to detect the positional information of the target object Ob on the display screen while illuminating an electro-optical panel of a type, particularly, which controls the light modulation state for each pixel, the position detecting light is caused to be incident from the light incident surface of each of the light guide plates 13A and 13B and to be emitted from the light emitting surface which is disposed to cross (in the illustrated example, be perpendicular to) the light incident surface. Therefore, it is possible to greatly reduce the number of elements for position detection compared with the known method in which a number of light sources and photodetectors or optical switches are arranged on the display screen. Accordingly, it is possible to achieve a significant simplification of the structure thereof, a reduction in the manufacturing cost, and a reduction in the power consumption. Moreover, in the present embodiment, by causing the illumination light L1 and the first position detecting light L2a to be incident from the first light incident surface 13aa of the first light guide plate 13A which has the first light guide structure LGA (and the light incidence structure having the sloped surface 13ag) being adapted to the illumination light and the first position detecting light, both lights can be caused to be emitted from the first light emitting surface 13ac in an efficient and uniform manner. Further, by causing the second position-detecting light source L2b to be incident from the second light incident surface 13ba of the second light guide plate 13B which has the second light guide structure LGB being adapted to the second position detecting light, the second position detecting light can be caused to be emitted from the second light emitting surface 13bc in an efficient and uniform manner. Therefore, the light emission characteristics along the internal propagation direction of each of the light guide plates 13A and 13B can be improved without being subject to restriction. Accordingly, the position detection can be performed with a high accuracy without sacrificing the illumination intensity or uniformity.

Although in the present embodiment, the position-detecting light sources 12A and 12B are disposed at the central portion of the side of the first light incident surface 13aa and the second light incident surface 13ba, respectively, the position-detecting light sources 12A and 12B may be disposed to oppose each other at both ends of the side of the first light incident surface 13aa (on both sides of the row of the illumination light sources 11), respectively, and the position-detecting light sources 12C and 12D may be disposed to oppose each other at both ends of the side of the second light incident surface 13ba, respectively. By doing so, the position detecting lights from the respective position-detecting light sources can be caused to be incident to the light guide plates 13A and 13B in a more efficient manner, and the position detecting lights can be caused to be emitted from the light emitting surfaces 13ac and 13bc in a more uniform manner.

Second Embodiment

Figure 3:
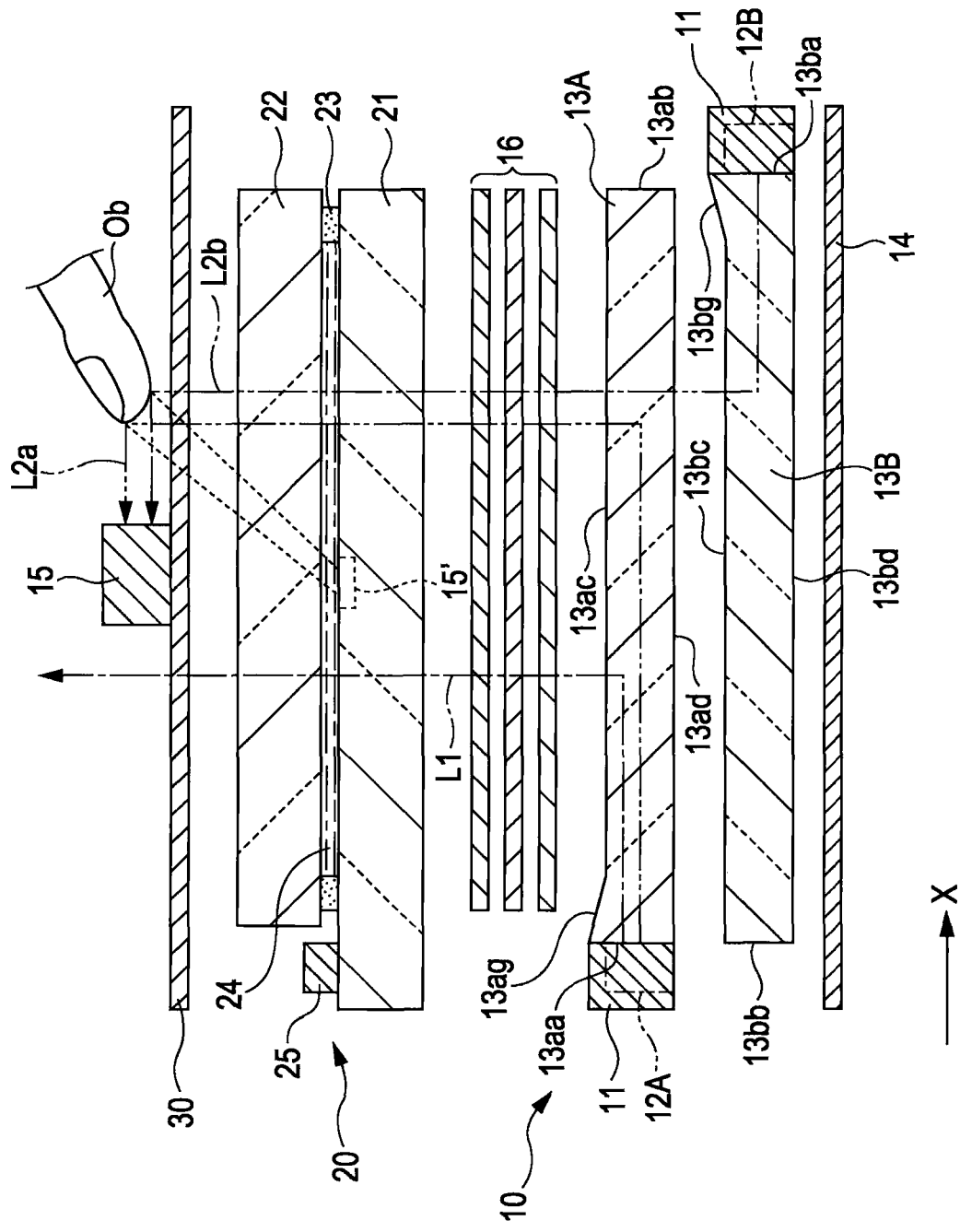
FIG. 3 is a simplified cross-sectional view schematically illustrating an illumination device and an electro-optical apparatus according to a second embodiment of the present invention.
Figure 4:
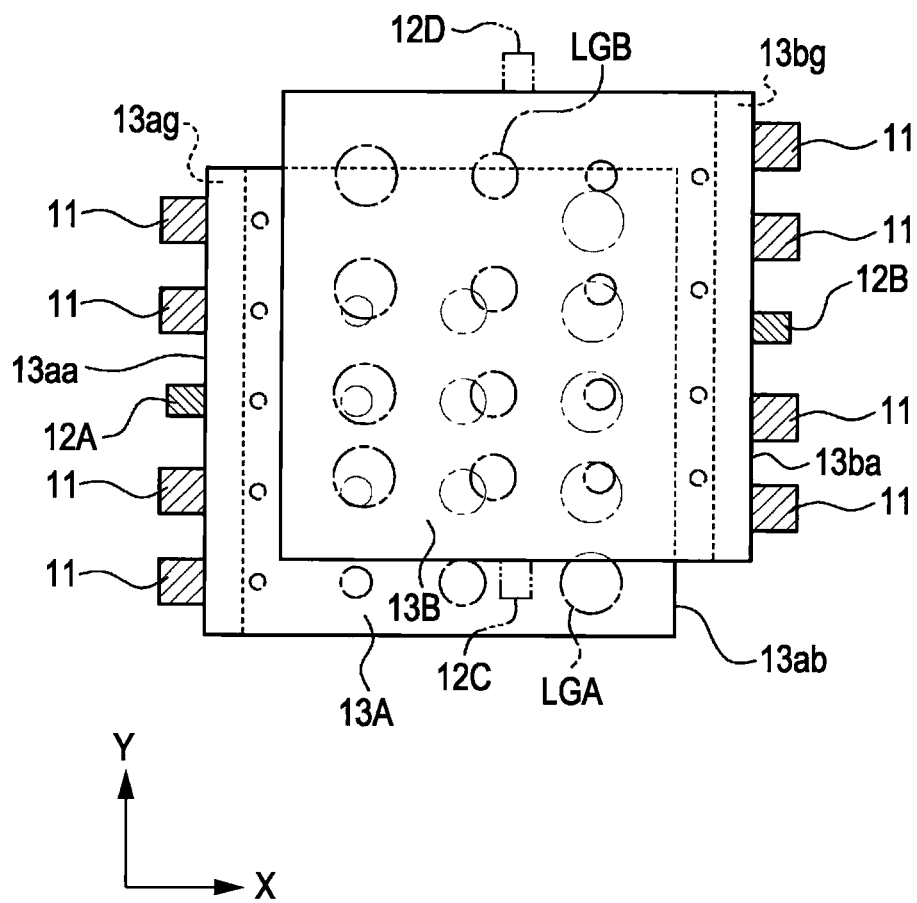
FIG. 4 is a perspective view of a light source and a light guide plate according to the second embodiment, as viewed from a rear surface thereof.

Next, a second embodiment of the invention will be described with reference to FIGS. 3 and 4. FIG. 3 is a simplified cross-sectional view schematically illustrating an illumination device and an electro-optical apparatus according to a second embodiment of the present invention, and FIG. 4 is a perspective view of a light source and a light guide plate according to the second embodiment, as viewed from a rear surface thereof.

In this embodiment, the same portions as those of the above-described first embodiment will be denoted by the same reference numerals, and descriptions thereof will be omitted. The present embodiment is different from the first embodiment in that the illumination light source 11 is disposed so as to oppose the second light incident surface 13ba of the second light guide plate 13B of the first embodiment. That is, in the present embodiment, the illumination light L1 emitted from the illumination light source 11 is incident to the first light guide plate 13A and the second light guide plate 13B from mutually opposite sides. Moreover, in this case, unlike the first embodiment, in the second light guide plate 13B, a sloped surface 13bg is formed, similar to the sloped surface 13ag, to be adjacent to the second light incident surface 13ba, and a light incidence structure capable of efficiently introducing the illumination light from the illumination light source 11 is provided. By doing so, it is possible to further increase the illumination intensity.

Third Embodiment

Figure 5:
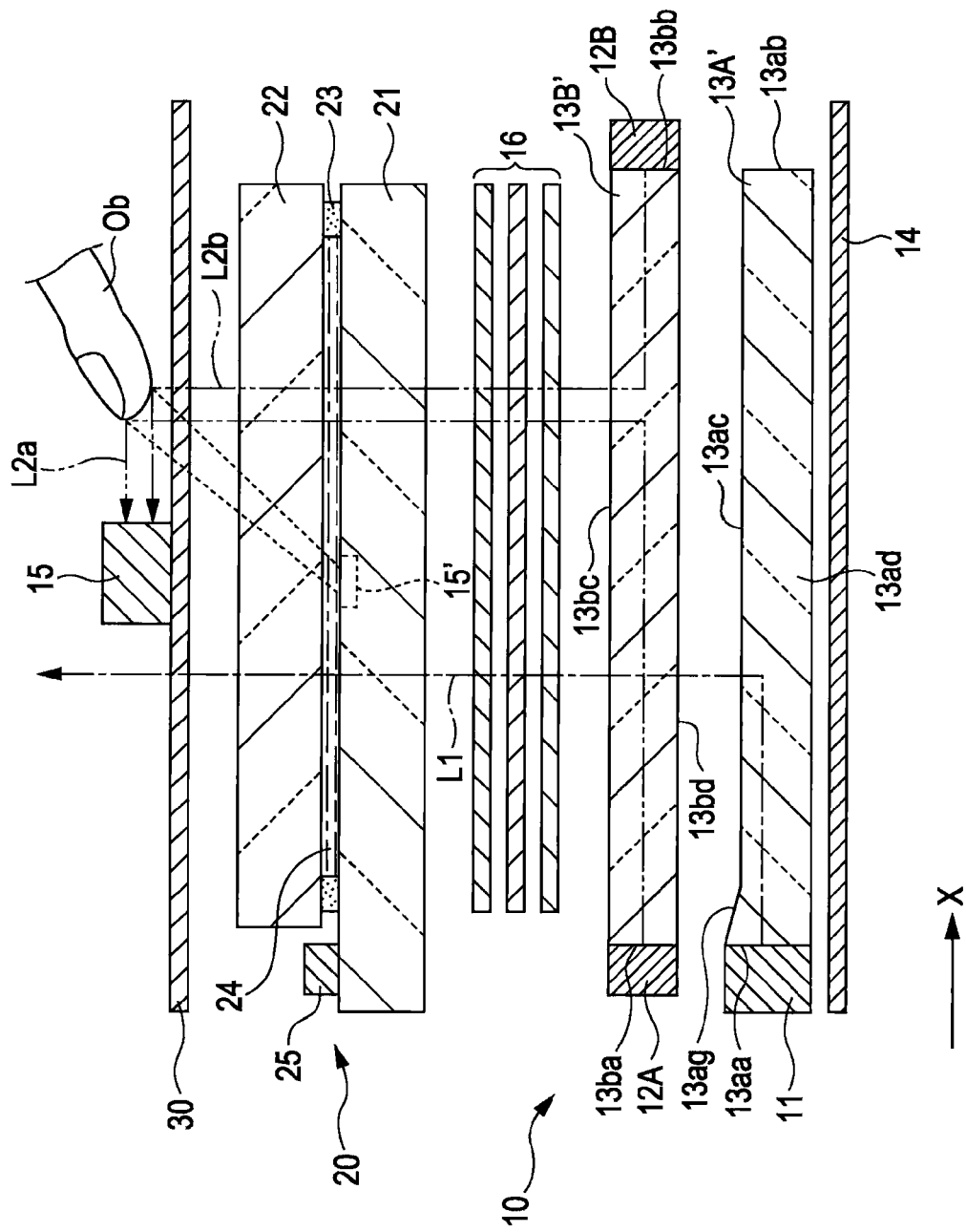
FIG. 5 is a simplified cross-sectional view schematically illustrating an illumination device and an electro-optical apparatus according to a third embodiment of the present invention.
Figure 6:
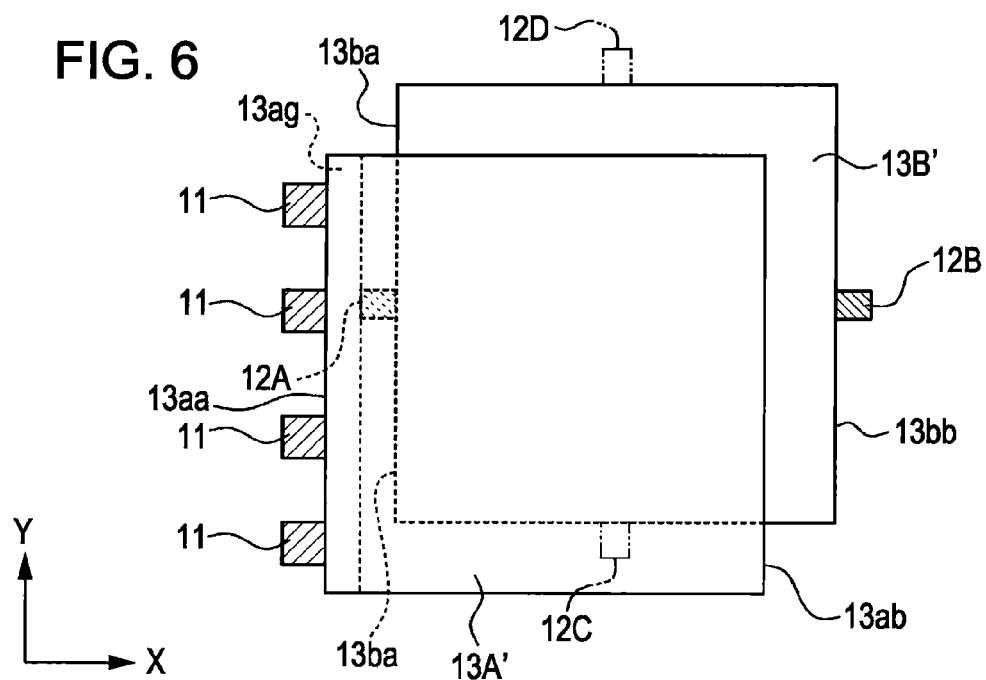
FIG. 6 is a perspective view of a light source and a light guide plate according to the third embodiment, as viewed from a rear surface thereof.

Next, a third embodiment of the invention will be described with reference to FIGS. 5 and 6. FIG. 5 is a simplified cross-sectional view schematically illustrating an illumination device and an electro-optical apparatus according to a third embodiment of the present invention, and FIG. 6 is a perspective view of a light source and a light guide plate according to the third embodiment, as viewed from a rear surface thereof.

In this embodiment, the same portions as those of the above-described second embodiment will be denoted by the same reference numerals, and descriptions thereof will be omitted. Although the present embodiment is similar to the second embodiment in that the same light guide plates 13A' and 13B' as those used in the second embodiment are provided, they are different in that one is an illuminating light guide plate 13A' and the other is a position-detecting light guide plate 13B'. Moreover, the illumination light source 11 is disposed so as to oppose the light incident surface 13aa of the illuminating light guide plate 13A', and position-detecting light sources 12A and 12B are disposed so as to oppose the light incident surfaces 13ba and 13bb of the position-detecting light guide plate 13B', respectively.

The illuminating light guide plate 13A' basically has the same configuration as the first light guide plate 13A of the first and second embodiments, and has a light incidence structure having the sloped surface 13ag and the first light guide structure LGA. A plurality of illumination light sources 11 are arranged along the side of the light incident surface 13aa.

On the other hand, on the position-detecting light guide plate 13B', a first light incident surface 13ba and a second light incident surface 13bb are provided on mutually different sides, the position-detecting light source 12A is disposed so as to oppose the first light incident surface 13ba, and the position-detecting light source 12B is disposed so as to oppose the second light incident surface 13bb. In the illustrated example, the first light incident surface 13ba and the second light incident surface 13bb are provided on mutually opposing sides, respectively.

By configuring as described above, regarding the illuminating light guide plate 13A', the light guide structure LGA can be set without necessity of making considerations for the position detecting light, and the illumination light L1 emitted from the illumination light source 11 can have emission characteristics corresponding to the required illumination performance. On the other hand, regarding the position-detecting light guide plate 13B', the light guide structure LGB can be set without necessity of making considerations for the illumination light, and the position detecting lights L2a and L2b emitted from the position-detecting light sources 12A and 12B can have emission characteristics corresponding to the required position detection performance. Therefore, a high level of compatibility can be achieved between the respective performances.

The present embodiment may be configured such that the position-detecting light sources 12C and 12D are disposed to oppose each other at appropriate positions of the position-detecting light guide plate 13B' so that the position detecting lights from these light sources can be used. For example, as denoted by the two-dot chain line in FIG. 6, the position-detecting light sources 12C and 12D may be disposed to oppose each other at a central portion of two sides different from the two sides in which the position-detecting light sources 12A and 12B are disposed to oppose each other at the central portion thereof, and alternatively, the light sources 12A and 12C and the light sources 12B and 12D may be disposed to oppose each other at both ends of each side of the light incident surfaces 13ba and 13bb.

Fourth Embodiment

Next, a fourth embodiment of the invention will be described with reference to FIG. 7. In this embodiment, the same portions as those of the above-described second embodiment will be denoted by the same reference numerals, and descriptions thereof will be omitted. The present embodiment illustrates a modified example of the relationship between the respective light sources and the light guide plates according to the second embodiment. In the second embodiment described above, the illumination light source 11 and the position-detecting light sources 12A and 12B are disposed to oppose each other on the light incident surfaces 13aa and 13ba which are provided on the mutually opposing sides of the light guide plates 13A and 13B which overlap with each other in plan view. The present embodiment is different from the second embodiment in that the light incident surfaces 13aa and 13ba are provided on mutually adjacent sides.

In the illustrated example, the light incident surfaces 13aa and 13ba are provided on different light guide plates 13A and 13B, respectively. By doing so, since lights incident from the respective light incident surfaces 13aa and 13ba are caused to be emitted while propagating through an inside of different light guide plates, the propagation characteristics or the emission characteristics of the illumination light or the position detecting light are less subject to restrictions. Therefore, even when respective lights are introduced from the adjacent sides as in the case of the illustrated example, it does not cause any serious problems. Accordingly, structural design can be performed with a higher degree of freedom in accordance with the structural arrangement of the apparatus.

In the present embodiment, wirings (not illustrated) are led out to be located on a substrate extension portion in which one substrate 21 of a pair of substrates 21 and 22 as the electro-optical panel 20 is extended outward from the other substrate 22, and a wiring circuit region 20P is provided on which a driving circuit 25 connected to the wirings is formed. The driving circuit 25 is configured by a semiconductor chip or the like which is mounted on the substrate extension portion. The wiring circuit region 20P of the illustrated example is configured in an L shape in plan view and is also configured to overlap, in plan view, with the light incident surface 13aa, the illumination light source 11 and the position-detecting light source 12A which are disposed to oppose the light incident surface 13aa, the light incident surface 13ba, and the illumination light source 11 and the position-detecting light source 12B which are disposed to oppose the light incident surface 13ba. In this manner, by setting the wiring circuit region 20P to be disposed on a side where it overlap, in plan view, with the respective light sources and the light incident surfaces to which the light sources are opposed, it is possible to reduce space wasting and achieve a compact size of the apparatus.

Figure 7:
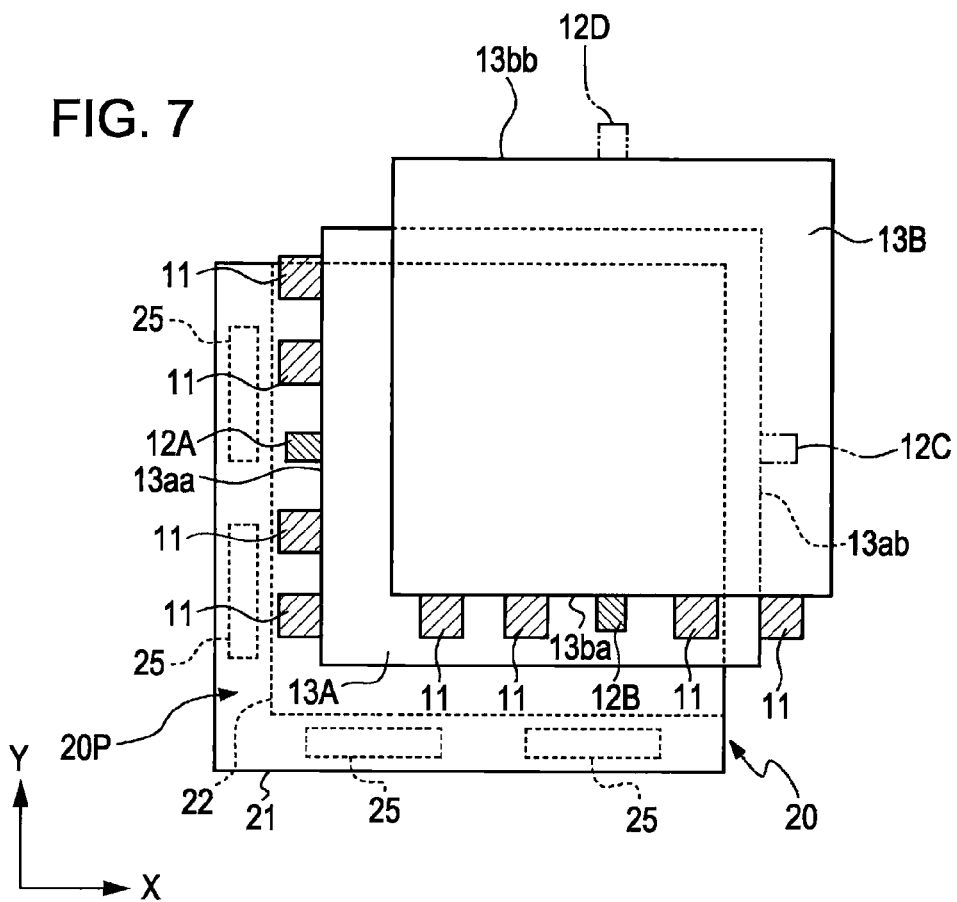
FIG. 7 is a perspective view of a light source and a light guide plate according to a fourth embodiment of the present invention, as viewed from a rear surface thereof.

When another position-detecting light sources 12C and 12D are provided, as denoted by the two-dot chain line in FIG. 7, for example, the light source 12C is disposed on a side of the light guide plate 13A opposing the light incident surface 13aa of the light guide plate 13A, and the light source 12D is disposed on a side of the light guide plate 13B opposing the light incident surface 13ba of the light guide plate 13B. By doing so, it is possible to further increase the accuracy of the position detection.

A configuration that two light incident surfaces are provided on adjacent sides and any of the light sources are disposed to oppose these light incident surfaces, which is the characteristic point of the present embodiment, can be similarly applied to the first and third embodiments described above. For example, in the first embodiment described above, an end face of the second light guide plate 13B (in FIG. 2, a side on which the light source 12D is disposed to be opposed), for example, which overlaps with a side adjacent to the first light incident surface 13aa of the first light guide plate 13A may be configured as the second light incident surface. Further, in the third embodiment described above, sides of the position-detecting light guide plate 13B, for example, which overlap with a side adjacent to the light incident surface 13aa of the illuminating light guide plate 13A on which the illumination light source 11 is disposed to be opposed may be configured as the light incident surfaces 13ba and 13bb, and the position-detecting light sources 12A and 12B may be disposed to oppose each other on these light incident surfaces. Moreover, the first light incident surface 13ba and the second light incident surface 13bb of the position-detecting light guide plate 13B may be formed on adjacent sides thereof.

Fifth Embodiment

Figure 8:
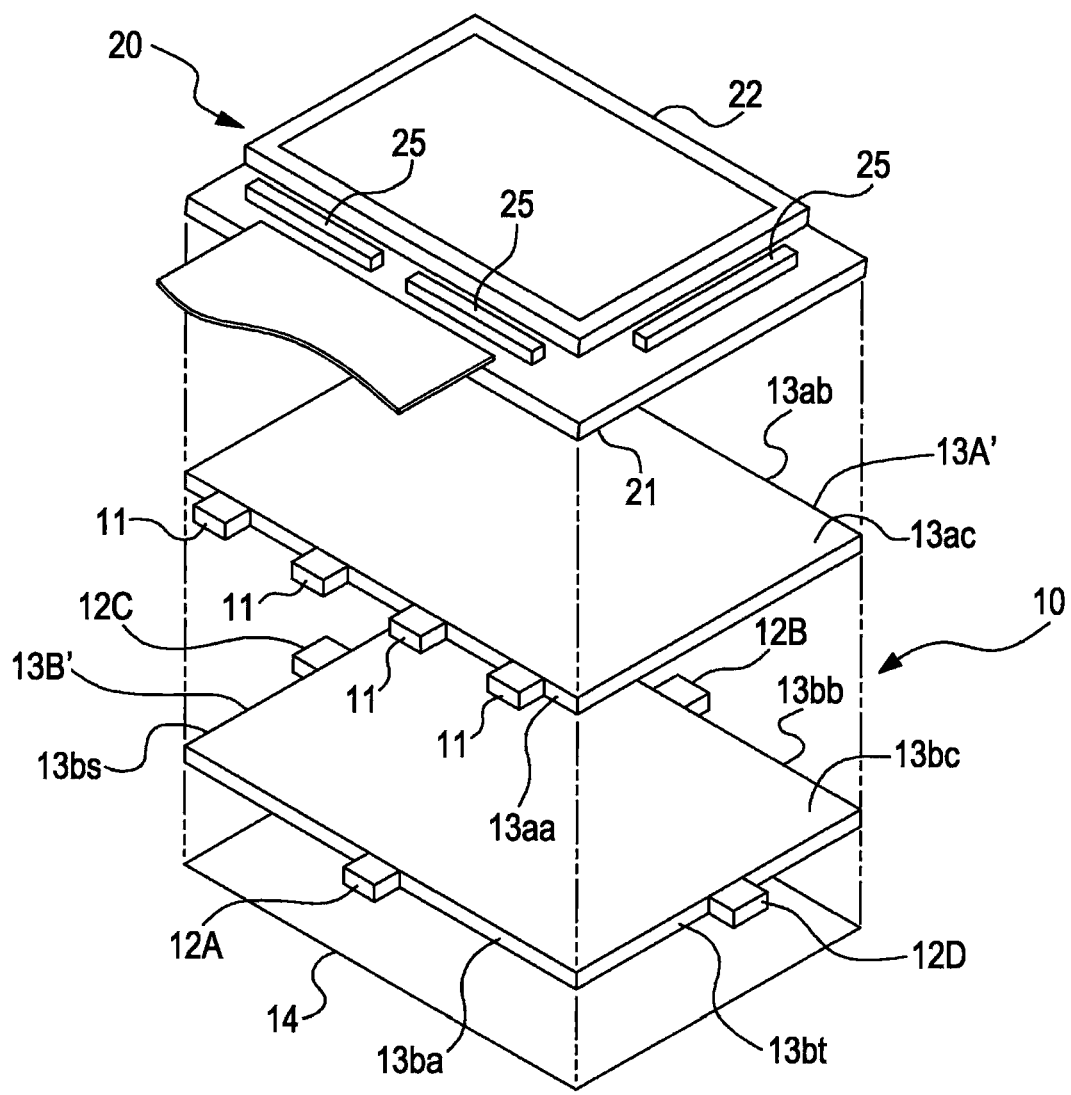
FIG. 8 is an exploded and perspective view illustrating a main configuration according to a fifth embodiment of the invention.
Figure 9:
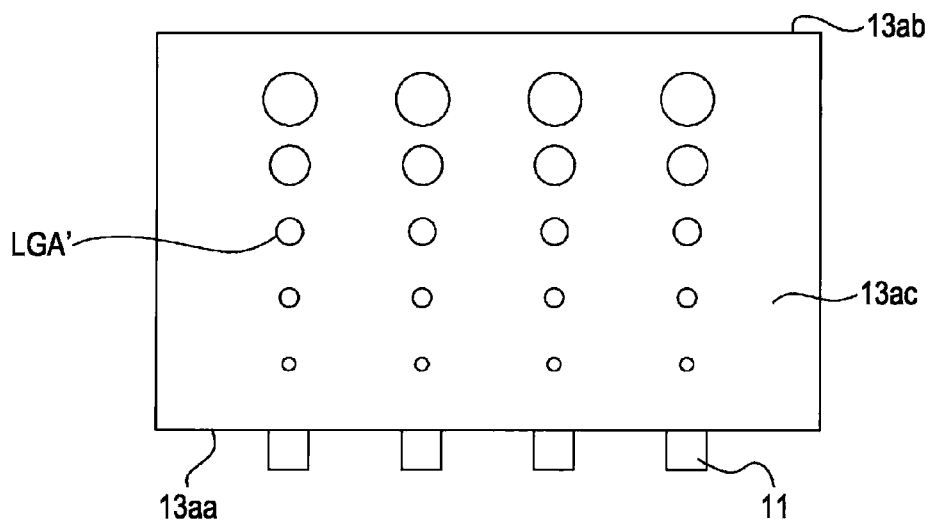
FIG. 9 is a plan view of an illuminating light guide plate according to the fifth embodiment.
Figure 10:
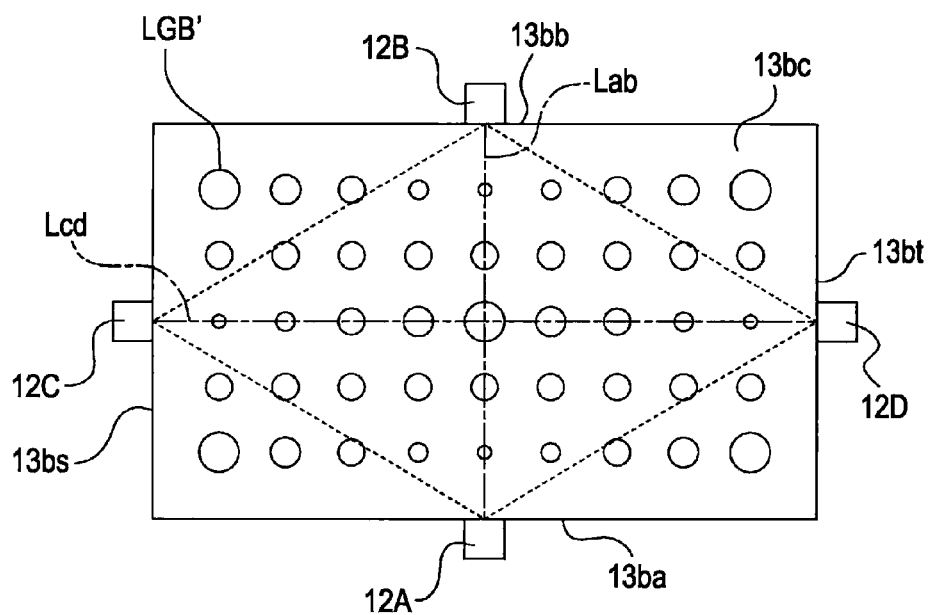
FIG. 10 is a plan view illustrating an example of a position-detecting light guide plate according to the fifth embodiment.

Next, a fifth embodiment of the invention will be described with reference to FIGS. 8 to 10. FIG. 8 is an exploded and perspective view illustrating a main configuration according to a fifth embodiment of the invention, FIG. 9 is a plan view of an illuminating light guide plate according to the fifth embodiment, and FIG. 10 is a plan view illustrating an example of a position-detecting light guide plate according to the fifth embodiment. In this embodiment, although the photodetector 15, the optical sheet 16, and the mounting board 30 illustrated with respect to the fourth embodiment are also provided, illustrations thereof are omitted in FIG. 8. In this embodiment, the same portions as those of the above-described respective embodiments will be denoted by the same reference numerals, and descriptions thereof will be omitted.

The present embodiment is basically similar to the third embodiment in that the illuminating light guide plate 13A' and the position-detecting light guide plate 13B' are provided. However, as illustrated in FIG. 8, the present embodiment is different from the third embodiment in that the illuminating light guide plate 13A' is disposed on the side of the electro-optical panel 20, and the position-detecting light guide plate 13B' is disposed on an opposite side to the electro-optical panel 20. It should be noted that as will be described later, in any of the third embodiment and the present embodiment, the positional relationship between the illuminating light guide plate 13A' and the position-detecting light guide plate 13B' as described above may be configured in an arbitrary manner.

The present embodiment is similar to the third embodiment in that by designing the light guide structure of the illuminating light guide plate 13A' and the light guide structure of the position-detecting light guide plate 13B' in a separate manner, the illumination function and the position detection function can be optimized in an independent manner. In the present embodiment, the illuminating light guide plate 13A' and the position-detecting light guide plate 13B' are configured in a rectangular shape as viewed in plan view thereof. The illuminating light guide plate 13A' has a plurality of illumination light sources 11 which is arranged along the light incident surface 13aa provided on one side thereof. The illumination light sources 11 are not disposed on the other side different from the one side. However, the invention is not limited to such an embodiment, the illumination light sources 11 may be disposed on other sides to oppose each other.

As schematically illustrated in FIG. 9, similar to the third embodiment, the illuminating light guide plate 13A' has a first light guide structure LGA' which is the same as that of the first and second embodiments. That is, the first light guide structure LGA' has a light guide structure in which a ratio of light intensity of the light emitted from the light incident surface 13aa to the internally propagating light increases gradually as it goes from the light incident surface 13aa configured by one side of the illuminating light guide plate 13A' toward the end face 13ab opposed to the light incident surface 13aa. This light guide structure is configured by a light guide path which extends along the light emitting surface 13ac and the back surface 13ad from the light incident surface 13aa to the end face 13ab and a light scattering structure which is provided on the light emitting surface 13*ac* or the back surface 13*ad* along the light guide path. This light scattering structure can be configured by an unevenness structure or a prism structure which is provided on a surface, a scattering layer which is formed on a surface, or the like. It should be noted that the light scattering structure may be configured by particles which are dispersed to an inside of the light guide path. The light guide structure in which the ratio of light intensity increases gradually along a predetermined direction as described above can be formed by gradually increasing the scatterability or the area ratio of the light scattering structure.

The above-described light guide structure LGA' of the illuminating light guide plate 13A' is a structure for causing the light emitted from the illumination light source 11 to be uniformly emitted from the light emitting surface 13*ac* along the above-mentioned direction. For example, the structure is configured such that as denoted by the solid line in FIG. 13, the luminance on the light emitting surface 13*ac* from the light incident surface 13*aa* to the end face 13*ab* becomes approximately uniform. It should be noted that the light guide structure LGA' is configured to be suitable for a case where the light emitted from the illumination light source 11 is visible light (which has a principal wavelength or central wavelength of 550 nm, for example). Therefore, in general, when light having different wavelength is made incident to the light guide structure LGA as described above, it is possible to obtain different emission characteristics. For example, when light is introduced to the illuminating light guide plate 13A' using the position-detecting light sources 12A to 12D in lieu of the illumination light source 11, since the light emitted from the position-detecting light sources 12A to 12D is infrared light (which has a principal wavelength or central wavelength of 850 nm, for example), the luminance on the light emitting surface 13*ac* from the light incident surface 13*aa* to the end face 13*ab* increases gradually along the above-mentioned direction as denoted by the dotted line in FIG. 13, and thus it is unable to obtain a uniform luminance distribution.

Such a deviation in the luminance distribution on the light emitting surface 13*ac* when the infrared light is used is thought to be caused by the fact that even when the same light scattering structure of the light guide structure LGA is provided, the scattering efficiency is low for shorter-wavelength light and the scattering efficiency is high for longer-wavelength light. Therefore, when the illumination light and the position detecting light have different wavelengths, since the light emission characteristics vary depending on the wavelength, it may be preferable for optimization of the light guide structure design to providing the illuminating light guide plate 13A' and the position-detecting light guide plate 13B' in a separate manner as in the case of the present embodiment. However, in optimization of the light guide structure design, not only from the reason that the above-mentioned wavelengths are different, but also from the viewpoint that the light propagation characteristics requested for the illumination function and the position detection function are different, it is preferable to provide the illuminating light guide plate 13A' and the position-detecting light guide plate 13B' in a separate manner.

In the present embodiment, as illustrated in FIG. 10, the first light incident surface 13*ba* and the second light incident surface 13*bb* which oppose each other are provided on both sides of the position-detecting light guide plate 13B', the position-detecting light source 12A is disposed so as to oppose the first light incident surface 13*ba*, and the position-detecting light source 12B is disposed so as to oppose the second light incident surface 13*bb*. In the illustrated example, the first light incident surface 13*ba* and the second light incident surface 13*bb* are provided on mutually opposing sides, respectively, and the position-detecting light sources 12A and 12B are disposed so as to oppose each other. However, it should be noted that the position-detecting light sources 12A and 12B may be disposed at mutually opposing positions with the position-detecting light guide plate 13B' disposed therebetween. Therefore, for example, these position-detecting light sources 12A and 12B may not be disposed on the sides of the position-detecting light guide plate 13B' but may be disposed in mutually opposing corner portions thereof.

On the position-detecting light guide plate 13B', a third light incident surface 13*bs* and a fourth light incident surface 13*bt* are further provided on mutually opposing sides. The position-detecting light source 12C is disposed so as to oppose the third light incident surface 13*bs*, and the position-detecting light source 12D is disposed so as to oppose the fourth light incident surface 13*bt*. Since the third light incident surface 13*bs* and the fourth light incident surface 13*bt* are provided on the mutually opposing sides as described above, the position-detecting light sources 12C and 12D are also disposed so as to oppose each other. However, it should be noted that the position-detecting light sources 12C and 12D may be disposed at mutually opposing positions with the position-detecting light guide plate 13B' disposed therebetween. Therefore, for example, these position-detecting light sources 12C and 12D may not be disposed on the sides of the position-detecting light guide plate 13B' but may be disposed in mutually opposing corner portions thereof.

In the present embodiment, a light guide structure LGB' is provided on the position-detecting light guide plate 13B'. As schematically illustrated in FIG. 10, the light guide structure LGB' is configured such that the ratio of light intensity of light emitted from the light emitting surface 13*bc* to the internally propagating light is small in the vicinity of the position-detecting light sources 12A to 12D, and that the ratio of light intensity increases as it goes away from the position-detecting light sources 12A to 12D. Such a configuration can be realized by changing the shape or distribution density of the light scattering structure.

Figure 11:
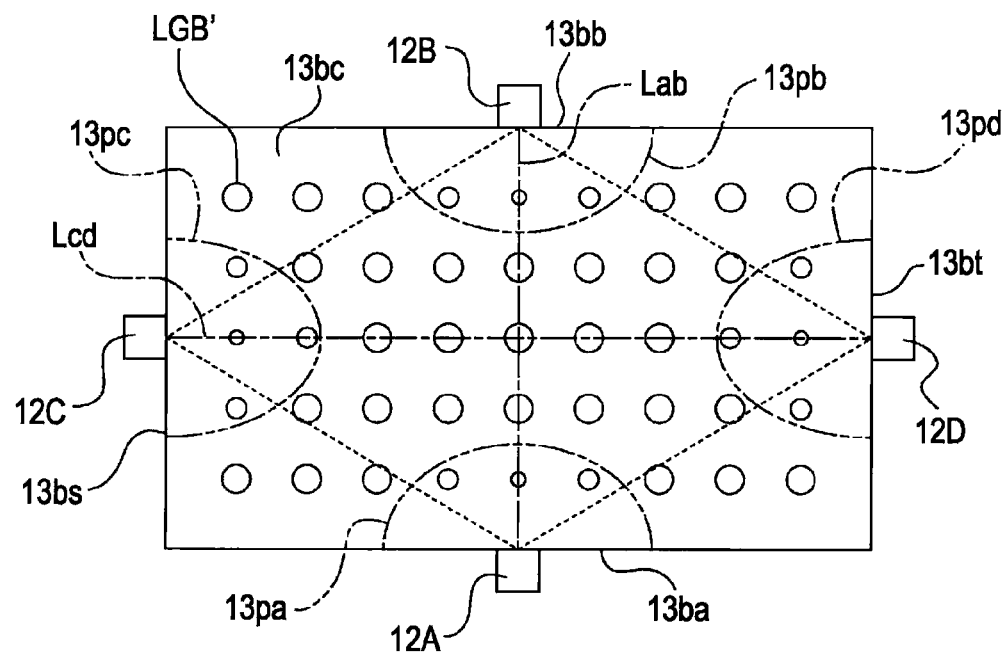
FIG. 11 is a plan view illustrating another example of the position-detecting light guide plate according to the fifth embodiment.

In the present embodiment, the light guide structure LGB' is configured such that the ratio of light intensity increases as it goes toward a central point of a line Lab which connects the position-detecting light sources 12A and 12B with each other. Further, the light guide structure is configured such that the ratio of light intensity increases as it goes toward a central point of a line Lcd which connects the position-detecting light sources 12C and 12D with each other. In FIGS. 10 and 11, the magnitude of the ratio of light intensity is schematically represented by the size of circles.

In particular, in the illustrated example, with respect to all combinations of two light sources among the four position-detecting light sources 12A to 12D and all lines connecting the two light sources (the lines other than the above-mentioned lines Lab and Lcd are denoted by the dotted lines), the light guide structure is configured such that the ratio of light intensity increases toward the central point of the line as viewed along any of the lines.

In the illustrated example, since the position-detecting light guide plate 13B' is configured in a rectangular shape that a distance between the light incident surfaces 13*ba* and 13*bb* is smaller than a distance between the light incident surfaces 13*bs* and 13*bt*, the line Lab is shorter than the line Lcd. Moreover, in conformity with such a shape, planar ranges 13*pa* and 13*pb* are narrow in an extending direction of the line Lab and wide in a direction perpendicular to the extending direction. On the other hand, planar ranges 13*pc* and 13*pd* are wide in the extending direction of the line Lab and narrow in the direction perpendicular to the extending direction.

By configuring the light guide structure LGB' in such a manner, emission of the position detecting light from the light emitting surface 13*bc* is suppressed in the vicinity of the position-detecting light sources 12A to 12D, and thus relatively uniform emission light intensity can be obtained as a whole.

Figure 13:
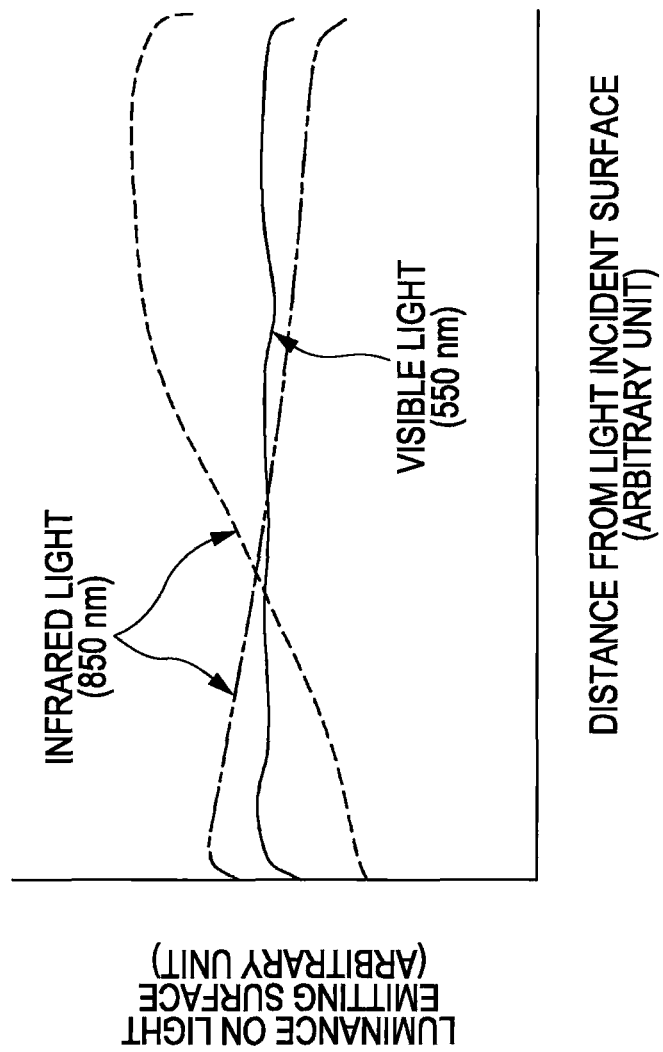
FIG. 13 is a graphical view illustrating different emission light distributions depending on wavelength.

However, in the light guide structure LGB' of this example, the light scattering structure must be formed with a structure and distribution suitable for the position detecting light and is therefore configured to change as it goes away from the position-detecting light sources 12A to 12D in a manner different from that of the light guide structure LGA' which is provided on the illuminating light guide plate 13A'. For example, in order to prevent generation of an emission light distribution as denoted by the dotted line in FIG. 13, the distance from the light source and the scatterability of the light scattering structure are set to be generally larger than that of the light guide structure LGA', and alternatively, an increase rate of the scatterability with the distance from the light source is set to be smaller than that of the light guide structure LGA'. Moreover, the emission light distribution which can be obtained as a result shows that in the emission light distribution denoted by the broken line in FIG. 13, the emission light intensity increases on a region where the distance from the light source is small, and the emission light intensity decreases on a region where the distance from the light source is large. The emission light distribution denoted by the one-dot chain line in FIG. 13 is an example of this case. In the illustrated example, the emission light intensity decreases gradually with the distance from the light source. That is, when this example of the emission light distribution is applied to the present embodiment, an emission light distribution in which the emission light intensity of the position detecting light gradually decreases as denoted by the one-dot chain line in FIG. 13 as it goes toward the central point of the above-mentioned line is formed.

Further, when the method of the positional information acquisition unit described with respect to the first embodiment is used, since the positional information is acquired using the attenuation of the position detecting light, even though the emission light distribution of the position detecting light is made uniform, it should not be made completely uniform but the emission light intensity needs to be configured to decrease gradually as the distance from the position-detecting light sources 12A to 12D increases. However, by changing the relation between the position coordinates and the attenuation ratio of the above-mentioned method, it is possible to acquire the positional information even when the emission light distribution is configured to have such a distribution (a distribution opposite to the distribution denoted by the one-dot chain line in FIG. 13) that the emission light intensity increases gradually as the above-mentioned distance increases.

FIG. 11 is a plan view schematically illustrating another example of a light guide structure LGB' different from the above-described one. In this example, in planar ranges 13*pa*, 13*pb*, 13*pc*, and 13*pd* located in the vicinity of the position-detecting light sources 12A to 12D among the planar regions of the light emitting surface 13*ac*, the ratio of light intensity of the light emitted from the light emitting surface 13*ac* to the internally propagating light is small and the ratio of light intensity in ranges outside the above-mentioned planar ranges is large.

Describing the example illustrated in FIG. 11 in more detail, although the ratio of light intensity increases gradually within the above-mentioned planar ranges 13*pa* to 13*pd* with the distance from the adjacent one of the position-detecting light source 12A to 12D, the ratio of light intensity is constant in ranges outside the above-mentioned planar ranges. However, the ratio of light intensity may be divided into two steps at the above-mentioned planar ranges and the other ranges, and alternatively, the ratio of light intensity is preliminarily configured to be divided into two steps and the ratio of light intensity may be gradually changed so that discontinuity of the ratio of light intensity at boundaries of the planar ranges and the other ranges is reduced.

In the example illustrated in FIG. 11, similar to the case of FIG. 10, the light guide structure LGB' is configured such that the ratio of light intensity increases along the line Lab connecting the position-detecting light sources 12A and 12B with each other as it goes toward the central point of the line Lab. Moreover, the light guide structure is also configured such that the ratio of light intensity increases along the line Lcd connecting the position-detecting light sources 12C and 12D with each other as it goes toward the central point of the line Lcd. Furthermore, with respect to all combinations of two light sources among the four position-detecting light sources 12A to 12D and all lines connecting the two light sources (the lines Lab and Lcd and the dotted lines), the light guide structure is configured such that the ratio of light intensity increases toward the central point of the line as viewed along any of the lines.

Furthermore, in the light guide structure LGB' of this example, similar to the example illustrated in FIG. 10, the light scattering structure must be formed with a structure and distribution suitable for the position detecting light and is therefore configured in a manner different from that of the light guide structure LGA' which is provided on the illuminating light guide plate 13A'. The emission light distribution denoted by the one-dot chain line in FIG. 13 is an example of this case. In the illustrated example, the emission light intensity decreases gradually with the distance from the light source. In addition, regarding the relationship with the positional information acquisition unit, the same statements as the example illustrated in FIG. 10 can be applied.

Figure 12:
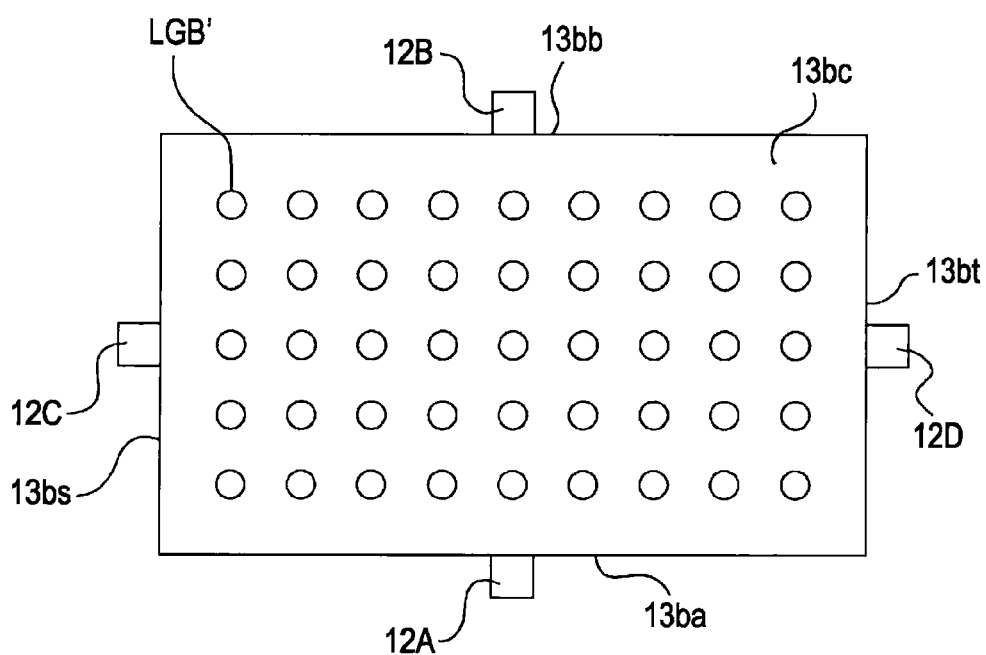
FIG. 12 is a plan view illustrating a further example of the position-detecting light guide plate according to the fifth embodiment.

Next, a further example of the light guide structure LGB' will be described with reference to FIG. 12. In this example, the light guide structure LGB' or the light scattering structure is configured to be approximately uniform over at least the entire position detection range of the position-detecting light guide plate 13B'. As a result, in response to emission of the position detecting light from the light emitting surface 13*bc*, it is possible to obtain an emission light distribution in which the emission light intensity of the position detecting light decreases gradually as the distance from the position-detecting light sources 12A to 12D increases.

As described above, in the position-detecting light guide plate 13B', unlike the illuminating light guide plate 13A', the uniformization of the emission light intensity is basically not necessarily required, but it is sufficient to achieve uniformization to an extent as required for securing an accuracy of the position detection. However, when the method of the positional information acquisition unit described with respect to the first embodiment is used, the change of the emission light intensity with the distance is essential. Therefore, in the position-detecting light guide plate 13B', similar to the example illustrated in FIG. 12, the light guide structure (light scattering structure) according to the embodiment for achieving the uniformization of the emission light intensity may not be provided. Instead, the light guide structure (light scattering structure) according to the embodiment for increasing the non-uniformity of the emission light intensity may be provided.

The illumination device and the electro-optical apparatus according to the invention are not limited to the illustrated examples described above but may be modified in various ways within a range that does not depart from the gist of the invention. For example, although the two light guide plates are disposed to be adjacent to each other and overlap with each other in a predetermined order in plan view, the two light guide plates may be disposed to overlap with each other in a reverse order, and in some cases, they may be disposed on both sides of the electro-optical panel. For example, the illuminating light guide plate may be disposed at the back of the electro-optical panel, and the position-detecting light guide plate may be disposed on the observation side of the electro-optical panel.

Moreover, in the above-described embodiment, as the position detection method, a method of calculating the positional information based on the light intensity ratio corresponding to the attenuation coefficient of the light intensity varying in accordance with a difference in the propagation distances of two types of position detecting lights was exemplified. However, the invention is not limited to the detection method, but the positional information may be calculated from a phase difference which varies in accordance with a difference in the propagation distances of two types of position detecting lights.

What is claimed is:

1. An illumination device comprising:
   an illumination light guide plate that has a first side surface and a second side surface opposite to the first side surface, and that has a first main surface continuing with the first side surface and the second side surface;
   a plurality of illumination light sources that are arranged at the first side surface and that emit illumination lithe such that the illumination light enters the illumination light guide plate through the first side surface, and the illumination light exits from the first main surface;
   a position-detecting light guide plate that has a third side surface and a fourth side surface opposite to the third side surface, that has a fifth side surface and a sixth side surface opposite to the fifth side surface, and that has a second main surface continuing with the third through sixth side surfaces;
   a first position detecting light source that emits first position detecting light, which enters the position-detecting light guide plate through the third side surface and which exits from the second main surface;
   a second position detecting light source that emits second position detecting light, which enters the position-detecting light guide plate through the fourth side surface and which exits from the second main surface;
   a third position detecting light source that emits third position detecting light, which enters the position-detecting light guide plate through the fifth side surface and which exits from the second main surface; and
   a fourth position detecting light source that emits fourth position detecting light, which enters the position-detecting light guide plate through the sixth side surface and which exits from the second main surface, wherein
   the position-detecting light guide plate is positioned adjacent to the first main surface and above the illumination light guide plate,
   both the first position detecting light source and the second position detecting light source are positioned on a first imaginary line in a first direction along a first shortest distance between the third side surface and the fourth side surface when viewed from a perpendicular direction perpendicular to the second main surface, and
   both the third position detecting light source and the fourth position detecting light source are positioned on a second imaginary line in a second direction along a second shortest distance between the fifth side surface and the sixth side surface when viewed from the perpendicular direction.

2. The illumination device according to claim 1, wherein the first position-detecting light source is disposed at a central portion of the third side surface of the position-detecting light guide plate, and the second position-detecting light source is disposed at a central portion of the fourth side surface of the position-detecting light guide plate.

3. The illumination device according to claim 1, wherein the illumination light guide plate is provided with a light guide structure in which a ratio of light intensity of the illumination light emitted from the first main surface to internally propagating light increases as it travels from the first side surface toward the second side surface.

4. The illumination device according to claim 2, wherein the third position-detecting light source is disposed at a central portion of the fifth side surface of the position-detecting light guide plate, and the fourth position-detecting light source is disposed at a central portion of the sixth side surface of the position-detecting light guide plate.

5. An electro-optical apparatus comprising:
   an illumination light guide plate that has a first side surface and a second side surface opposite to the first side surface, and that has a first main surface continuing the first side surface and the second side surface;
   a plurality of illumination light sources that are arranged at the first side surface and that emit illumination light such that the illumination light enters the illumination light guide plate through the first side surface, and the illumination light exits from the first main surface;
   a position-detecting light guide plate that has a third side surface and a fourth side surface opposite to the third side surface, that has a fifth side surface and a sixth side surface opposite to the fifth side surface, and that has a second main surface continuing with the third through sixth side surfaces;
   a first position detecting light source that emits first position detecting light, which enters the position-detecting light guide plate through the third side surface and which exits from the second main surface;
   a second position detecting light source that emits second position detecting light, which enters the position-detecting light guide plate through the fourth side surface and which exits from the second main surface;
   a third position detecting light source that emits third position detecting light, which enters the position-detecting light guide plate through the fifth side surface and which exits from the second main surface;
   a fourth position detecting light source that emits fourth position detecting light, which enters the position-detecting light guide plate through the sixth side surface and which exits from the second main surface;
   an electro-optical panel that is positioned above the illuminating light guide plate in the perpendicular direction; and
   a photodetector that is positioned at a side to which the first through fourth position detecting light are emitted, and that detects reflected light of each of the first through fourth position detecting light reflected from a target object, wherein the position-detecting light guide plate is positioned adjacent to the first main surface and above the illumination light guide plate in the perpendicular direction, the electro-optical panel positioned adjacent to the second main surface and above the position-detecting light guide plate in the perpendicular direction, both the first position detecting light source and the second position detecting light source are positioned on a first imaginary line in a first direction along a first shortest distance between the third side surface and the fourth side surface when viewed from a perpendicular direction perpendicular to the second main surface, and both the third position detecting light source and the fourth position detecting light source are positioned on a second imaginary line in a second direction along a second shortest distance between the fifth side surface and the sixth side surface when viewed from the perpendicular direction.

6. The illumination device according to claim 5, wherein
the first position-detecting light source is disposed at a central portion of the third side surface of the position-detecting light guide plate,
the second position-detecting light source is disposed at a central portion of the fourth side surface of the position-detecting light guide plate,
the third position-detecting light source is disposed at a central portion of the fifth side surface of the position-detecting light guide plate, and
the fourth position-detecting light source is disposed at a central portion of the sixth side surface of the position-detecting light guide plate.

7. The illumination device according to claim 5, wherein the illumination light guide plate is provided with a light guide structure in which a ratio of light intensity of the illumination light emitted from the first main surface to internally propagating light increases as it travels from the first side surface toward the second side surface.

* * * * *